(12) United States Patent
Resch et al.

(10) Patent No.: US 10,029,545 B2
(45) Date of Patent: Jul. 24, 2018

(54) BELTLINE REINFORCEMENT MEMBER FOR A DOOR OF A VEHICLE

(71) Applicant: GM GLOBAL TECHNOLOGY OPERATIONS LLC, Detroit, MI (US)

(72) Inventors: Stephen A. Resch, Macomb, MI (US); Michael J. Wesner, Washington, MI (US); James C. O'Kane, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 209 days.

(21) Appl. No.: 15/087,366

(22) Filed: Mar. 31, 2016

(65) Prior Publication Data

US 2017/0282695 A1 Oct. 5, 2017

(51) Int. Cl.
*B60J 5/04* (2006.01)
*B62D 29/00* (2006.01)

(52) U.S. Cl.
CPC .......... *B60J 5/0426* (2013.01); *B62D 29/008* (2013.01)

(58) Field of Classification Search
CPC ...................................................... B60J 5/0426
USPC ....................................................... 296/146.6
See application file for complete search history.

(56) References Cited

U.S. PATENT DOCUMENTS

| | | | | |
|---|---|---|---|---|
| 8,454,078 | B2* | 6/2013 | Sachdev | B60J 5/0425 296/146.6 |
| 8,510,997 | B2* | 8/2013 | Nakamori | B60J 5/0425 296/146.6 |
| 9,156,335 | B1* | 10/2015 | Harter | E05B 81/76 |
| 9,610,829 | B1* | 4/2017 | Stachewicz | B60J 5/0444 |
| 2011/0113697 | A1* | 5/2011 | Sachdev | B60J 5/0425 49/502 |
| 2016/0082813 | A1* | 3/2016 | Hofer | B60J 5/0426 49/501 |
| 2017/0210210 | A1* | 7/2017 | Lange | B60J 5/0402 |
| 2017/0274742 | A1* | 9/2017 | Lange | B60J 5/0402 |

FOREIGN PATENT DOCUMENTS

| | | | | |
|---|---|---|---|---|
| DE | 19540187 | A1 * | 4/1997 | B60J 5/0426 |
| DE | 10038200 | A1 * | 2/2002 | B60J 5/0426 |
| DE | 102010005365 | A1 * | 7/2011 | B60J 5/0426 |
| DE | 102011109725 | A1 * | 2/2013 | B60J 5/0426 |
| DE | 102012015184 | A1 * | 2/2013 | B60J 5/0426 |
| DE | 202015102898 | U1 * | 8/2015 | E05B 81/76 |
| FR | 2989636 | A1 * | 10/2013 | B60J 5/0481 |

(Continued)

*Primary Examiner* — Hilary L Gutman
(74) *Attorney, Agent, or Firm* — Quinn IP Law

(57) ABSTRACT

A beltline reinforcement member for a door of a vehicle includes a body that extends along a longitudinal axis, between a first end and a second end. The body includes, an inner belt wall extending generally parallel to the longitudinal axis, an outer belt wall extending generally parallel to the longitudinal axis and spaced apart from the inner belt wall for receiving a window between the inner belt wall and the outer belt wall, a first end wall interconnecting the inner belt wall and the outer belt wall at the first end of the body, and a second end wall interconnecting the inner belt wall and the outer belt wall at the second end of the body. The inner belt wall, the outer belt wall, the first end wall, and the second end wall are integrally formed together as a single, unitary structure, such as by a casting process.

17 Claims, 4 Drawing Sheets

(56) References Cited

FOREIGN PATENT DOCUMENTS

| FR | 2995861 A1 | * | 3/2014 | ............ B60J 5/0413 |
|---|---|---|---|---|
| FR | 2995865 A1 | * | 3/2014 | ............ B60J 5/0412 |
| JP | 59230821 A | * | 12/1984 | |
| JP | 2007168766 A | * | 7/2007 | ............ B60J 5/0425 |
| JP | 2009269591 A | * | 11/2009 | ............ B60J 5/0426 |
| JP | 2012131301 A | * | 7/2012 | |
| JP | 2014073784 A | * | 4/2014 | ............ B60J 5/0411 |
| JP | 2015089769 A | * | 5/2015 | |
| JP | 2015202719 A | * | 11/2015 | |
| JP | 2015209059 A | * | 11/2015 | |
| JP | 2016120810 A | * | 7/2016 | |
| WO | WO-2004050406 A1 | * | 6/2004 | ............ B60J 5/0426 |
| WO | WO-2007111785 A1 | * | 10/2007 | ............ B60J 5/0405 |
| WO | WO-2015081507 A1 | * | 6/2015 | ............. B22D 17/00 |

\* cited by examiner

BELTLINE REINFORCEMENT MEMBER FOR A DOOR OF A VEHICLE

TECHNICAL FIELD

The disclosure generally relates to a beltline reinforcement member for a door of a vehicle.

BACKGROUND

Vehicular doors typically include an internal structure or frame, which is covered on an exterior side by an exterior body panel, and is covered on an interior side by an interior trim panel. The internal structure of the door typically includes a beltline reinforcement member, which extends along the beltline of the vehicle. The term "beltline" refers to a line extending rearward from a hood of the vehicle, and usually follows a bottom edge of the side windows of the vehicle. The beltline reinforcement member provides stability and strength to the internal structure of the door, and supports the exterior body panel and the interior trim panel along the beltline. Typically, the beltline reinforcement member is comprised of several independently formed or stamped metal components that are then attached together, such as by welding or with fasteners, either directly or indirectly via other components of the door.

SUMMARY

A beltline reinforcement member for a door of a vehicle is provided. The beltline reinforcement member includes a body that extends along a longitudinal axis, between a forward end and a rearward end. The body includes an inner belt wall extending generally parallel to the longitudinal axis, an outer belt wall extending generally parallel to the longitudinal axis and spaced apart from the inner belt wall for receiving a window between the inner belt wall and the outer belt wall, a forward end wall interconnecting the inner belt wall and the outer belt wall at the forward end of the body, and a rearward end wall interconnecting the inner belt wall and the outer belt wall at the rearward end of the body. The inner belt wall, the outer belt wall, the forward end wall, and the rearward end wall are integrally formed together as a single, unitary structure, such as by a casting process.

Accordingly, because the body of the beltline reinforcement member is integrally formed as a single, unitary structure or manufacture, the body of the beltline reinforcement member does not include any joints, thereby enhancing the strength of the beltline reinforcing member, and decreasing dimensional variability that may occur from connecting independently formed components. Furthermore, because the beltline reinforcement member is formed or cast as a single, unitary structure, the beltline reinforcement member may be shaped to include stiffness enhancing features to increase the strength of the beltline reinforcement member relative to multiple piece beltline reinforcement members, while possibly reducing an overall mass of the beltline reinforcement member, which are not feasible when using metal stamping and attachment methods known for manufacturing a beltline reinforcement member from independently formed metal components.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Referring to the Figures, wherein like numerals indicate like parts throughout the several views, a beltline reinforcement member is generally shown at 20. The beltline reinforcement member 20 is part of an internal frame structure of a door of a vehicle. The term "beltline" refers to a line extending rearward from a hood of the vehicle, and usually follows a bottom edge of the side windows of the vehicle. The beltline reinforcement member 20 is attached to other structural components of the door to form the internal framework of the door, and generally extends along the beltline of the vehicle.

Figure 1:
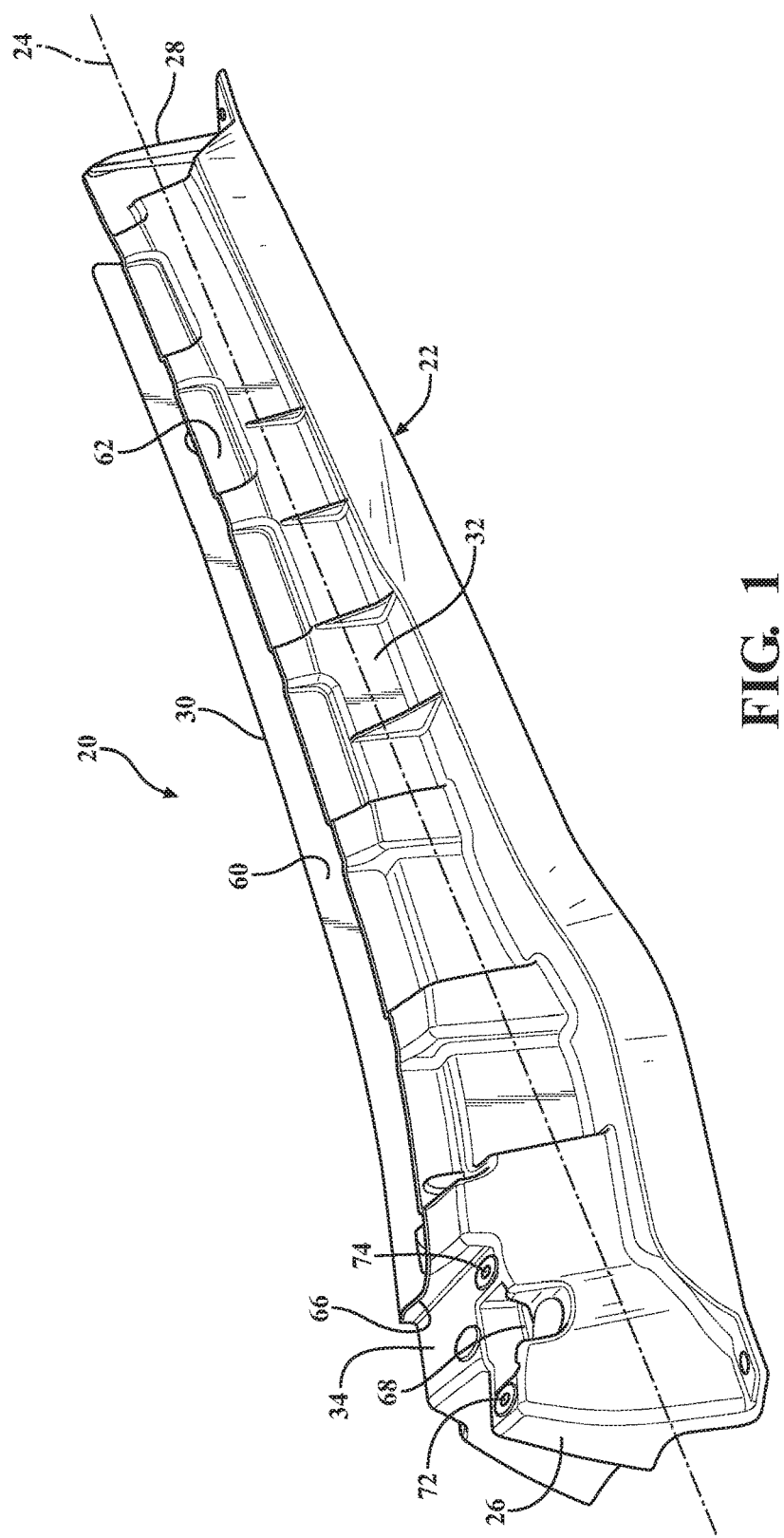
FIG. 1 is a schematic perspective view of a beltline reinforcement member from an exterior side.
Figure 2:
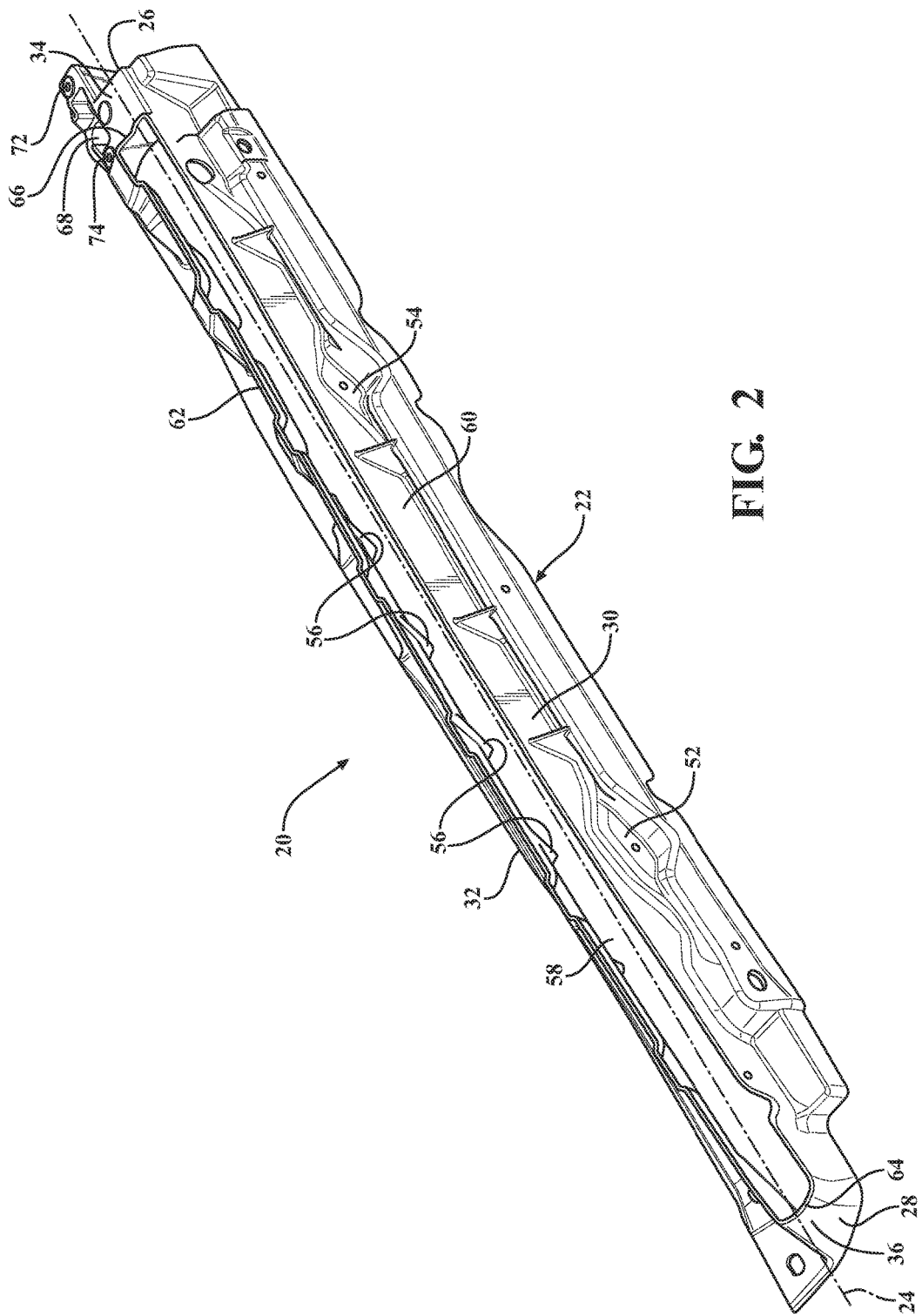
FIG. 2 is a schematic perspective view of the beltline reinforcement member from an interior side.

Referring to FIGS. 1 and 2, the beltline reinforcement member 20 includes a body 22. The body 22 extends along a longitudinal axis 24, between a first end 26 and a second end 28. As used herein, the "first end 26" refers to a forward or front facing end of the beltline reinforcement member 20 relative to a body of a vehicle, and the "second end 28" refers to rearward or rear facing end of the beltline reinforcement member 20 relative to a body of a vehicle. However, it should be appreciated that the terms "first end 26" and "second end 28" are merely descriptive, and may refer to either axial end of the beltline reinforcement member 20 relative to the longitudinal axis 24 of the beltline reinforcement member 20.

The body 22 is formed from a rigid material as a single, unitary structure or manufacture. In an exemplary embodiment, the body 22 is formed using a casting or molding process. For example, the body 22 may be cast as a single casting, or molded as a single formed structure. The specific forming, casting, or molding process used to form the body 22 is not pertinent to the teachings of this disclosure. Accordingly, the body 22 may be formed from any suitable forming, casting or molding process known to those skilled in the art that is capable of forming the body 22, including its pertinent features and shapes, as a single, unitary structure or manufacture. The body 22 may be formed from any suitable material, such as but not limited to, an aluminum alloy, a steel alloy, a magnesium alloy, a plastic composition, or a fiber reinforced plastic composition. The fiber reinforced plastic composition may include, but is not limited to, a carbon fiber reinforced composite, a glass fiber reinforced composite, a metal foil reinforced composite, or some other similar material. It should be appreciated that the body 22 may be formed from any material capable of being formed into the desired shape of the body 22, and which includes the required strength and rigidity capable of providing the requisite design strength and performance characteristics of the door.

Figure 3:
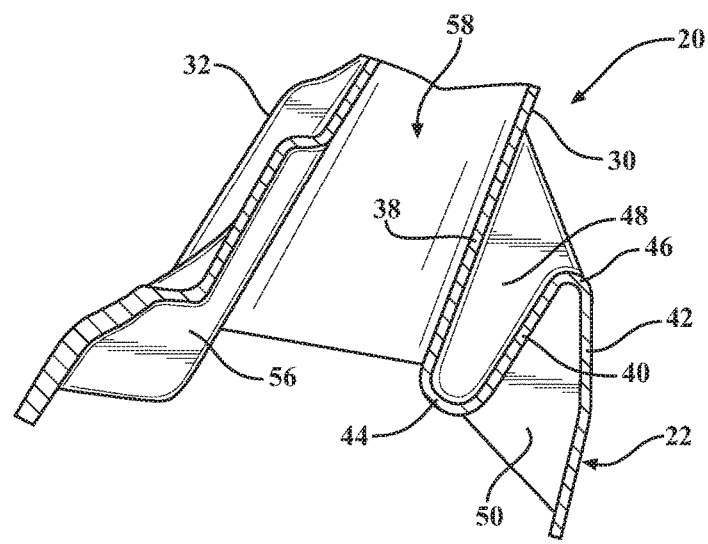
FIG. 3 is a schematic cross sectional view of the beltline reinforcement member perpendicular to a longitudinal axis of the beltline reinforcement member.
Figure 4:
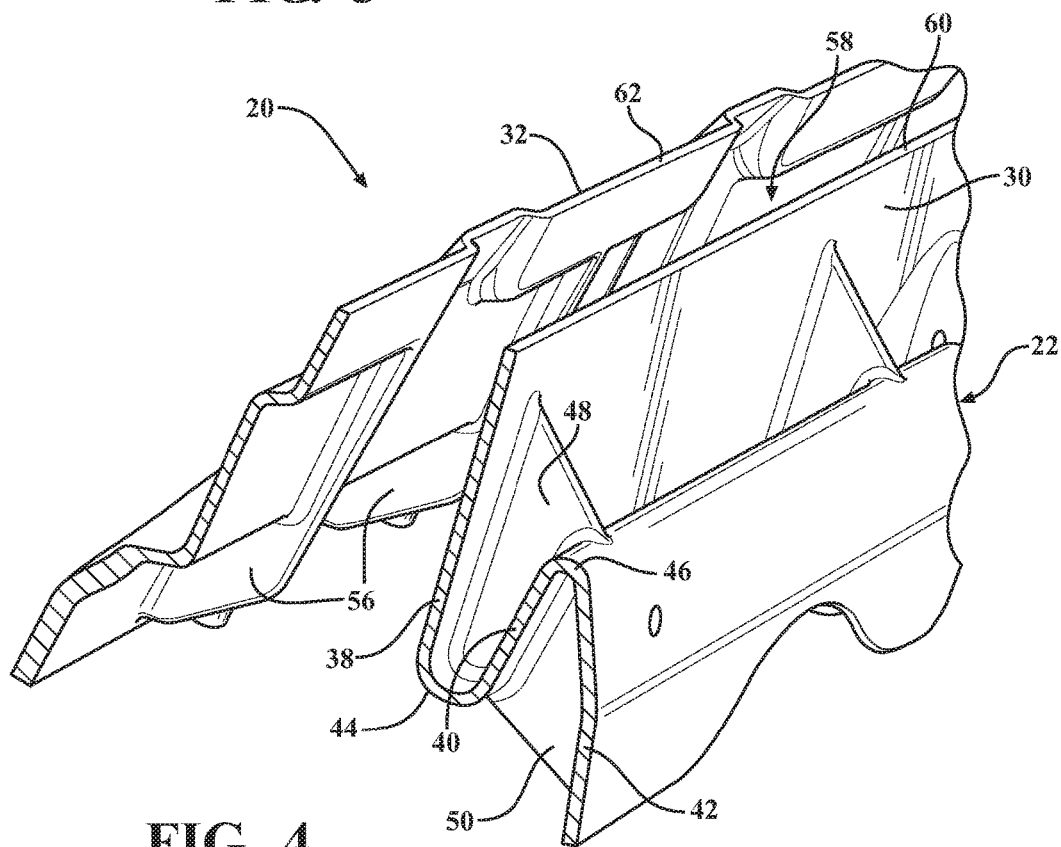
FIG. 4 is a schematic fragmentary cross sectioned perspective view of the beltline reinforcement member.

As shown in FIGS. 1 and 2, the body 22 includes an inner belt wall 30, an outer belt wall 32, a first end wall 34, and a second end wall 36. As noted above, the inner belt wall 30, the outer belt wall 32, the first end wall 34, and the second end wall 36 are integrally formed together as a single, unitary structure. The inner belt wall 30 extends generally parallel to the longitudinal axis 24. Referring to FIGS. 3 and 4, the inner belt wall 30 defines a cross section generally perpendicular to the longitudinal axis 24 having a serpentine shape. The serpentine shape may be described as a sideway "S" shape, i.e., an "S" shape rotated ninety degrees. The general serpentine cross sectional shape of the inner belt wall 30 is extended along the longitudinal axis 24. The serpentine shaped cross section of the inner belt wall 30 includes an inner wall portion 38, a central wall portion 40, an outer wall portion 42, a first corner portion 44, and a second corner portion 46. The first corner portion 44 interconnects the inner wall portion 38 and the central wall portion 40. The second corner portion 46 interconnects the central wall portion 40 and the outer wall portion 42. The inner wall portion 38 of the inner belt wall 30 is configured to be generally parallel with a window disposed between the inner belt wall 30 and the outer belt wall 32.

Referring to FIGS. 3 and 4, the inner belt wall 30 includes a plurality of inner ribs 48, and a plurality of outer ribs 50. The inner ribs 48 are spaced apart from each other along the longitudinal axis 24. Each of the inner ribs 48 extends between the inner wall portion 38 and the central wall portion 40 of the inner belt wall 30. The outer ribs 50 are spaced apart from each other along the longitudinal axis 24. Each of the outer ribs 50 extends between the central wall portion 40 and the outer wall portion 42. As shown in the Figures in the exemplary embodiment, one of the inner ribs 48 is coaxially located along the longitudinal axis 24 with one of the outer ribs 50. However, it should be appreciated that the inner ribs 48 and the outer ribs 50 do not need to be orientated relative to each other in this fashion.

Referring to FIG. 2, the inner belt wall 30 includes a first mount 52 and a second mount 54. The first mount 52 and the second mount 54 are spaced apart from each other along the longitudinal axis 24. The first mount 52 and the second mount 54 and configured for supporting a window regulator assembly (not shown). Accordingly, it should be appreciated that the window regulator assembly would be attached to the inner belt wall 30 at the location of the first mount 52 and the second mount 54 respectively. The window regulator assembly may be attached to the inner belt wall 30 at the first mount 52 and the second mount 54 with a fastener, such as bolt or screw, or in some other manner known to those skilled in the art.

Referring to FIGS. 2 and 4, the outer belt wall 32 extends generally parallel to the longitudinal axis 24, and is spaced apart from the inner belt wall 30 to define a space or gap therebetween. The body 22 of the beltline reinforcement member 20 is configured for receiving a window between the inner belt wall 30 and the outer belt wall 32, through the space or gap therebetween. Referring to FIGS. 3 and 4, the outer belt wall 32 includes a plurality of lateral supports 56. Each of the lateral supports 56 extends toward the inner belt wall 30. The lateral supports 56 are spaced apart from each other along the longitudinal axis 24.

Referring to FIGS. 1 and 2, the first end wall 34 interconnects the inner belt wall 30 and the outer belt wall 32 at the first end 26 of the body 22. The second end wall 36 interconnects the inner belt wall 30 and the outer belt wall 32 at the second end 28 of the body 22. Accordingly, the first end wall 34, the inner belt wall 30, the second end wall 36, and the outer belt wall 32, are all integrally formed together as a single unit, and cooperate to define an opening 58 therebetween, through which a window of the door may pass.

As is known in the art, a door of a vehicle having a window therein will include seals around the opening 58 of the beltline reinforcement member 20 for sealing against the window, in order to prevent moisture, dirt, dust and debris from entering into an interior of the door through the opening 58. Accordingly, referring to FIG. 2, the inner belt wall 30 includes an inner belt seal flange 60 that is configured for supporting an inner belt seal (not shown) thereon. Similarly, the outer belt wall 32 includes an outer belt seal flange 62 configured for supporting an outer belt seal (not shown) thereon, the second end wall 36 includes a rearward belt seal flange 64 configured for supporting a rearward belt seal (not shown) thereon, and the first end wall 34 includes a forward belt seal flange 66 configured for supporting a forward belt seal (not shown) thereon. The different beltline seals may be attached to the inner belt seal flange 60, the outer belt seal flange 62, the rearward belt seal flange 64, and the forward belt seal flange 66 in any suitable manner known to those skilled in the art. For example, the beltline seals may include multiple clips that engage the inner belt seal flange 60, the outer belt seal flange 62, the rearward belt seal flange 64, and the forward belt seal flange 66 in interlocking engagement as is known in the art.

Figure 5:
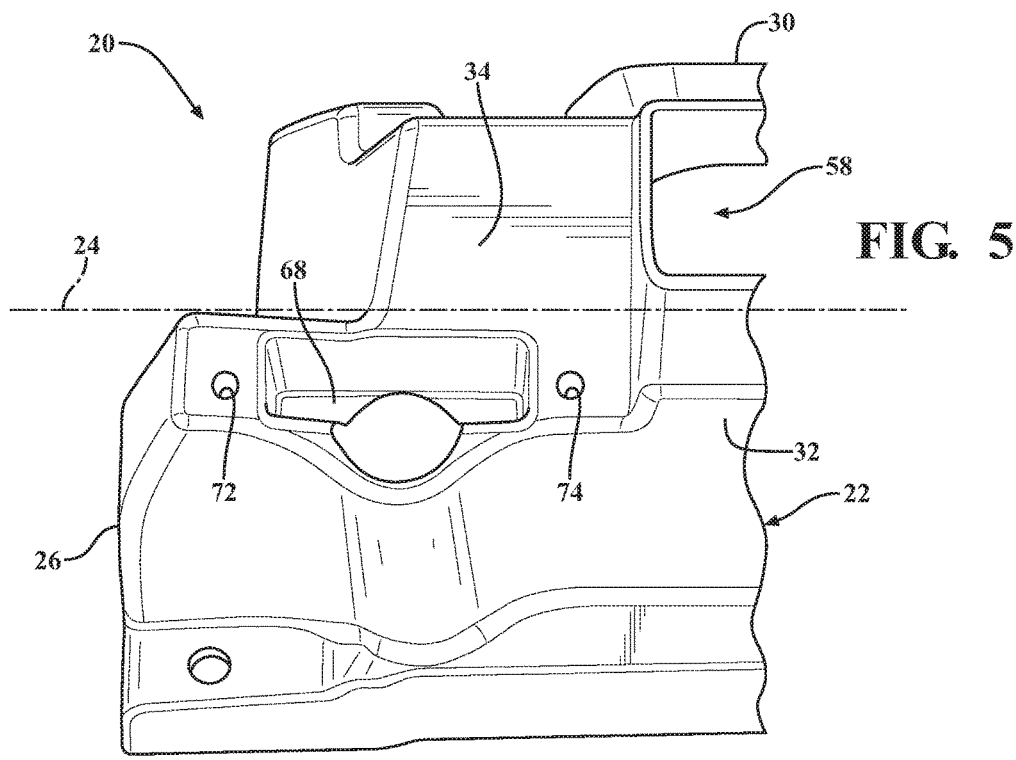
FIG. 5 is a schematic fragmentary perspective view of the beltline reinforcement member showing a recess pocket for attaching a base of a side view mirror assembly to the beltline reinforcement member.
Figure 6:
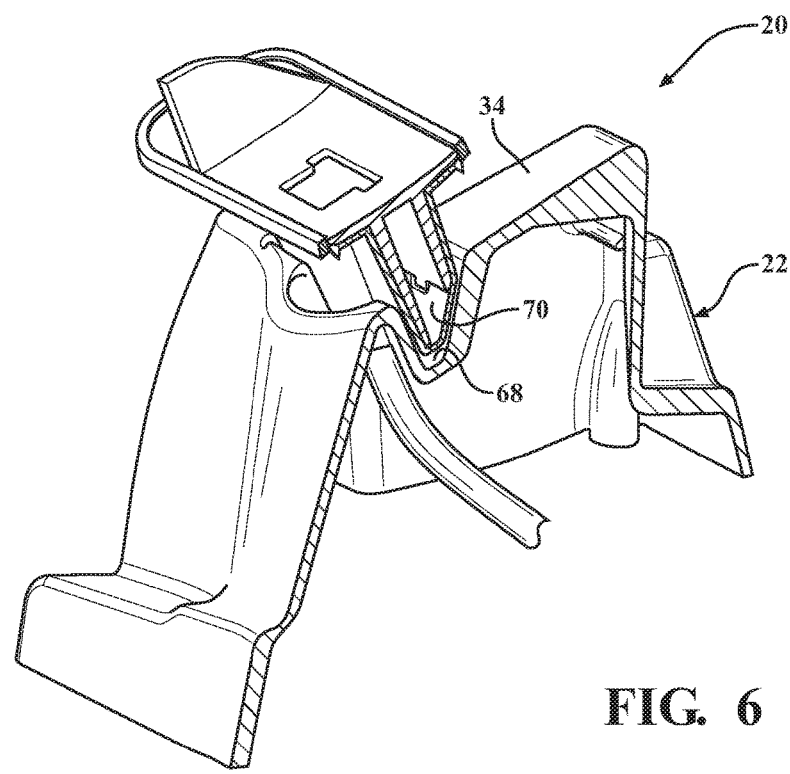
FIG. 6 is a schematic fragmentary, cross sectional perspective view of the beltline reinforcement member showing the base of the side view mirror assembly disposed within the recess pocket.

Referring to FIGS. 5 and 6, the body 22 includes a recessed pocket 68. As shown in the Figures and described herein, the recessed pocket 68 is defined by the first end wall 34. However, it should be appreciated that the recessed pocket 68 may alternatively be defined by the outer belt wall 32 instead. The recessed pocket 68 is configured for receiving a wedge shaped base 70 of a side view mirror therein. The recessed pocket 68 defines a wedge shaped cross section generally perpendicular to the longitudinal axis 24 for mating engagement with the wedge shaped base 70 of the side view mirror. The body 22 includes a first threaded aperture 72 and a second threaded aperture 74 located at opposing longitudinal ends of the recessed pocket 68 from each other. The first threaded aperture 72 and the second threaded aperture 74 are configured for receiving fasteners therein for attaching the base 70 of the side view mirror to the body 22. As the base 70 of the side view mirror assembly is tightened against the body 22 of the beltline reinforcement member 20, the wedge shaped base 70 of the mirror assembly is drawn down tightly into the wedge shaped recessed pocket 68 in the, due to the wedge shaped base 70 of the mirror assembly fitting within the wedge shaped recessed pocket 68. This enables the use of only two fasteners in order to provide a stable attachment of the side view mirror assembly to the body 22 of the beltline reinforcement member 20. Accordingly, the body 22 includes only the first threaded aperture 72 and the second threaded aperture 74 for attaching the side view mirror to the body 22.

As described above, the body 22 of the beltline reinforcement member 20 is formed as a single, unitary structure, such as with a casting or molding process. This eliminates any joints that would exist using typical metal stamping and joining techniques previously used to form beltline door reinforcements. Those skilled in the art will appreciate that it is not possible to form the various shapes and/or features of the beltline reinforcement member 20 described herein, including the serpentine shape of the inner belt wall 30, the inner ribs 48 and the outer ribs 50 of the inner belt wall 30, the lateral supports 56 of the outer belt wall 32, the recessed pocket 68, as a single, unitary structure, using standard metal stamping techniques. Accordingly, the known process of stamping several different, independent components and then joining the independent components to form a prior art beltline door reinforcement is not suitable for manufacturing the beltline reinforcement member 20 described herein. By forming the beltline reinforcement member 20 as a single, unitary structure, all joint lines are eliminated, which increases the strength of the beltline reinforcement member 20 and decreases dimensional variability of the beltline reinforcement member 20 relative to reinforcement members that are constructed from multiple, stamped metal components. Additionally, by using a molding or casting process, the body 22 may be formed with the more complex, geometric shapes and features described herein, which enhance the strength of the beltline reinforcement member 20 while decreasing the mass of the beltline reinforcement member 20, than was previously possible relative to reinforcement members that are constructed from multiple, stamped metal components.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A beltline reinforcement member for a door of a vehicle, the beltline reinforcement member comprising:
   a body extending along a longitudinal axis between a first end and a second end, wherein the body includes:
   an inner belt wall extending generally parallel to the longitudinal axis;
   an outer belt wall extending generally parallel to the longitudinal axis and spaced apart from the inner belt wall for receiving a window between the inner belt wall and the outer belt wall;
   a first end wall interconnecting the inner belt wall and the outer belt wall at the first end of the body;
   wherein the first end wall includes a recessed pocket for receiving a wedge shaped base of a side view mirror therein; and
   a second end wall interconnecting the inner belt wall and the outer belt wall at the second end of the body;
   wherein the inner belt wall, the outer belt wall, the first end wall, and the second end wall are integrally formed together as a single, unitary structure.

2. The beltline reinforcement member set forth in claim 1 wherein the recessed pocket defines a wedge shaped cross section generally perpendicular to the longitudinal axis for mating engagement with the wedge shaped base of the side view mirror.

3. The beltline reinforcement member set forth in claim 1 wherein the body includes a first threaded aperture and a second threaded aperture located at opposing longitudinal ends of the recessed pocket from each other, relative to the longitudinal axis, for receiving fasteners therein for attaching the base of the side view mirror to the body.

4. The beltline reinforcement member set forth in claim 3 wherein the body includes only the first threaded aperture and the second threaded aperture for attaching the side view mirror to the body.

5. The beltline reinforcement member set forth in claim 1 wherein the inner belt wall defines a cross section generally perpendicular to the longitudinal axis having a serpentine shape.

6. The beltline reinforcement member set forth in claim 5 wherein the serpentine shaped cross section of the inner belt wall includes:
   an inner wall portion;
   a central wall portion;
   a first corner portion interconnecting the inner wall portion and the central wall portion;
   an outer wall portion; and
   a second corner portion interconnecting the central wall portion and the outer wall portion.

7. The beltline reinforcement member set forth in claim 6 wherein the inner belt wall includes a plurality of inner ribs spaced apart from each other along the longitudinal axis, with each of the plurality of inner ribs extending between the inner wall portion and the central wall portion.

8. The beltline reinforcement member set forth in claim 7 wherein the inner belt wall includes a plurality of outer ribs spaced apart from each other along the longitudinal axis, with each of the plurality of outer ribs extending between the central wall portion and the outer wall portion.

9. The beltline reinforcement member set forth in claim 6 wherein the outer belt wall includes a plurality of lateral supports extending toward the inner belt wall and spaced apart from each other along the longitudinal axis.

10. The beltline reinforcement member set forth in claim 6 wherein the inner wall portion of the inner belt wall is configured to be generally parallel with the window disposed between the inner belt wall and the outer belt wall.

11. The beltline reinforcement member set forth in claim 1 wherein the inner belt wall includes a first mount and a second mount spaced apart from each other along the longitudinal axis, and configured for supporting a window regulator assembly from the first mount and the second mount.

12. The beltline reinforcement member set forth in claim 1 wherein:
   the inner belt wall includes an inner belt seal flange for supporting an inner belt seal thereon;
   the outer belt wall includes an outer belt seal flange for supporting an outer belt seal thereon;
   the second end wall includes a rearward belt seal flange for supporting a rearward belt seal thereon; and
   the first end wall includes a forward belt seal flange for supporting a forward belt seal thereon.

13. The beltline reinforcement member set forth in claim 1 wherein the body is formed from one of an aluminum alloy, a steel alloy, a magnesium alloy, a plastic composition, or a fiber reinforced plastic composition.

14. A reinforcement member for a door, the reinforcement member comprising:
   a body extending along a longitudinal axis between a first end and a second end, wherein the body is integrally cast as a single, unitary structure to include:

an inner belt wall extending generally parallel to the longitudinal axis;

wherein the inner belt wall defines a cross section generally perpendicular to the longitudinal axis having an inner wall portion, a central wall portion, a first corner portion interconnecting the inner wall portion and the central wall portion, an outer wall portion, and a second corner portion interconnecting the central wall portion and the outer wall portion;

an outer belt wall extending generally parallel to the longitudinal axis and spaced apart from the inner belt wall;

a first end wall interconnecting the inner belt wall and the outer belt wall at the first end of the body;

a second end wall interconnecting the inner belt wall and the outer belt wall at the second end of the body; and a recessed pocket for receiving a wedge shaped base of a side view mirror therein, wherein the recessed pocket defines a wedge shaped cross section generally perpendicular to the longitudinal axis for mating engagement with the wedge shaped base of the side view mirror.

15. The reinforcement member set forth in claim 14 wherein the inner belt wall includes a plurality of inner ribs spaced apart from each other along the longitudinal axis, with each of the plurality of inner ribs extending between the inner wall portion and the central wall portion.

16. The reinforcement member set forth in claim 15 wherein the inner belt wall includes a plurality of outer ribs spaced apart from each other along the longitudinal axis, with each of the plurality of outer ribs extending between the central wall portion and the outer wall portion.

17. The reinforcement member set forth in claim 16 wherein the outer belt wall includes a plurality of lateral supports extending toward the inner belt wall and spaced apart from each other along the longitudinal axis.

* * * * *